Nov. 1, 1932.  J. KING  1,885,522

MACHINE FOR MAKING PLATING BARRELS

Filed June 10, 1931   7 Sheets-Sheet 1

INVENTOR,
John King
BY
ATTORNEY

Nov. 1, 1932.　　　　　J. KING　　　　　1,885,522
MACHINE FOR MAKING PLATING BARRELS
Filed June 10, 1931　　　7 Sheets-Sheet 3

INVENTOR,
John King,
BY Howard S. Smith
ATTORNEY

Nov. 1, 1932. J. KING 1,885,522
MACHINE FOR MAKING PLATING BARRELS
Filed June 10, 1931 7 Sheets-Sheet 4

Nov. 1, 1932. J. KING 1,885,522
MACHINE FOR MAKING PLATING BARRELS
Filed June 10, 1931 7 Sheets-Sheet 5

INVENTOR,
John King.
BY Howard S. Smith,
His ATTORNEY

FIG. 19

Nov. 1, 1932.  J. KING  1,885,522

MACHINE FOR MAKING PLATING BARRELS

Filed June 10, 1931   7 Sheets-Sheet 7

INVENTOR,
John King,
BY Howard S. Smith
His ATTORNEY

Patented Nov. 1, 1932

1,885,522

UNITED STATES PATENT OFFICE

JOHN KING, OF DAYTON, OHIO

MACHINE FOR MAKING PLATING BARRELS

Application filed June 10, 1931. Serial No. 543,340.

This invention relates to new and useful improvements in a machine for making plating barrels.

It is the principal object of my invention to provide a simple and efficient machine for the above purpose.

My invention contemplates the provision of a ram carrying a dowel which moves between the wood splints held by forwardly positioned fingers and rearwardly positioned fingers. Fluted rolls receive the splints, or material to be woven, from the fingers which cross each other and are reversed while the rolls turn to form or bend the splints around the dowels carried by the spacing rings on the rolls. One dowel after another is carried by the rams into position between the two sets of splints until the weaving operation is finished.

A gate is then operated to hold one half of the completed woven material and the ram the other, after which the end members are secured to the finished weave by screws or other means to complete the plating barrel.

In the accompanying drawings illustrating my invention.

Referring to the accompanying drawings for a detailed description of my invention, the numeral 1 designates a base frame upon which are mounted two slidable side bearing blocks 2, 2 through which two pressure screws 3, 3 pass. Fast on the outer end of each screw 3 is a bevel gear 4 with which a bevel gear 5 meshes. The two bevel gears 5, 5 are fast on the ends of a transverse shaft 6 journaled in brackets 7, 7 on the slidable bearing blocks 2. A crank wheel 8 is secured to one end of the transverse shaft 6. By means of this crank wheel the gears 5, 5 are rotated to turn the gears 4, 4 on the outer ends of the pressure screws 3, 3. When so turned by the gears 5, 5, these screws shift the sliding blocks 2, 2 to carry the forming roll 11 toward the stationary forming roll 14.

Secured upon the sliding blocks 2, 2 are upright bearings 9, 9 for a shaft 10 upon which a fluted forming roll 11 is mounted. (See Figures 1 and 3.) Mounted on a shaft 12 journaled in bearings 13, 13 immediately behind the shaft 10 is a large, stationary fluted forming roll 14.

Figure 20:
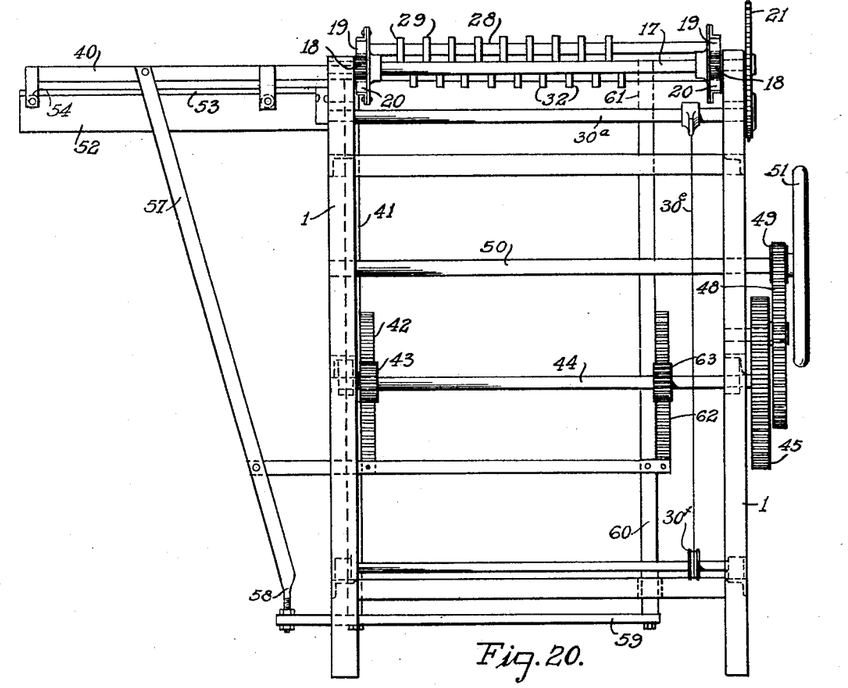
Fig. 20 is a rear view of the same.
Figure 21:
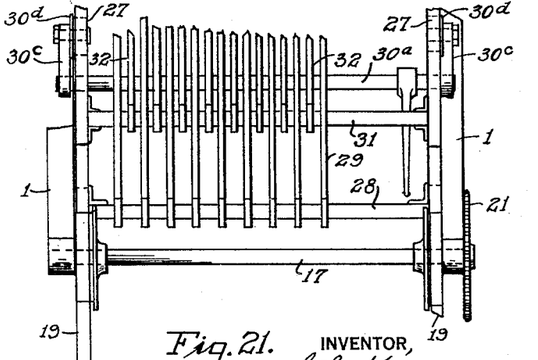
Fig. 21 is a top plan view of the rear portion of the machine.

Mounted in two upright bearings 15, 15 carried by vertical extensions 16, 16 on the rear end of the frame 1, is a transverse finger operating shaft 17. Secured upon the shaft 17, near each bearing 15, is a pinion 18. (See Figure 19.) In engagement with the pinions 18 are two upper slidable rack bars 19 and two lower slidable rack bars 20 one pair on each side of the machine, whereby these upper and lower rack bars are moved in reverse directions when the shaft 17 is rotated by the following means. (See Figs. 19, 20 and 21.)

Secured to one end of the shaft 17 is a sprocket wheel 21 around which passes a sprocket chain 22 that encircles a small sprocket wheel 23 fast on a transverse shaft 24 carried by a bearing bracket 25 mounted on the frame 1. Secured to the shaft 24 is a hand wheel 26 by which the rack bars 19 and 20 are reciprocated through the sprocket and pinion mechanism just described, to actuate the weaving fingers now to be described.

Secured to the front end of the upper pair of rack bars 19, 19 is a finger carrying frame 27 including two cross bars 28, 28 to which a series of forwardly projecting fingers 29 are attached. To the front ends of the lower pair of rack bars 20, 20 there is secured a finger carrying frame 30 including cross bars 31, 31 to which a series of forwardly projecting fingers 32 are attached. The fingers 29 and 32, which will be hereinafter described, are disposed for a fore and aft movement between each other when the rack bars are reciprocated.

Figures 2, 16, 17, 18:
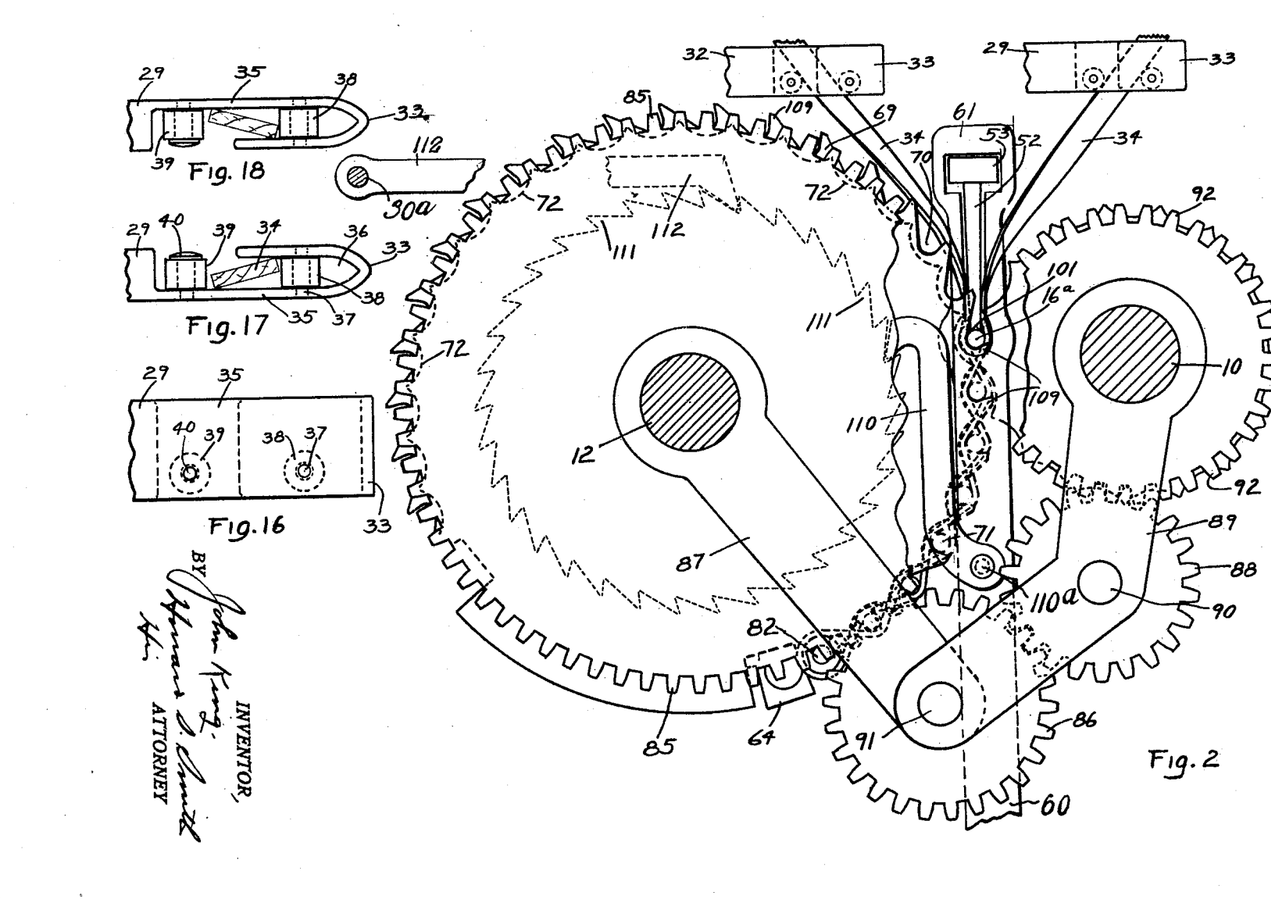
Figure 2 is a sectional view taken through the machine, showing how the splints are held between the rolls.
Figure 16 is a side view of the front end of the finger in Figure 2.
Figure 17 is a plan view of the front end of the finger in Figure 2.
Figure 18 is another form of finger extremity.

Each one of the fingers 29 and 32 comprises a straight bar that terminates at its front end in a downwardly and outwardly projecting foot portion 33. The horizontal part of the foot portion 33 of each finger is constructed as follows to receive a wood splint 34. Referring to Figure 17, each finger end is formed with a straight side 35 that is bent around its outer end to form a U-shaped part 36 to receive a stud 37 upon which a roller 38 is loosely mounted. Beyond the U-shaped part 36 of the finger another roller 39 is loosely mounted upon a stud 40 secured to its straight part 35. Between these two rollers 38 and 39 of each finger a splint is received. In Figure 18 I have shown a finger tip similar to that shown in Figure 17 except that it is right hand.

Projecting laterally from the side of the machine opposite the side that carries the finger operating sprocket mechanism, is a vertically movable ram carrying bar 40ª. At its inner end this bar is mounted on the upper end of a vertically movable post 41 in line with the space between the fluted rollers 11 and 14. This post, which is movably supported by the frame 1, has secured to its lower end a rack 42 that is operated by a pinion 43 fast on a transverse shaft 44 journaled in suitable bearings in said frame 1.

Secured to the outer end of the shaft 44 is a gear 45 which meshes with a pinion 46 on a stub shaft 47 carrying a large gear 48. This gear meshes with a pinion 49 on a shaft 50 which is rotated by a hand wheel 51. (See Figure 1.)

Figure 1:
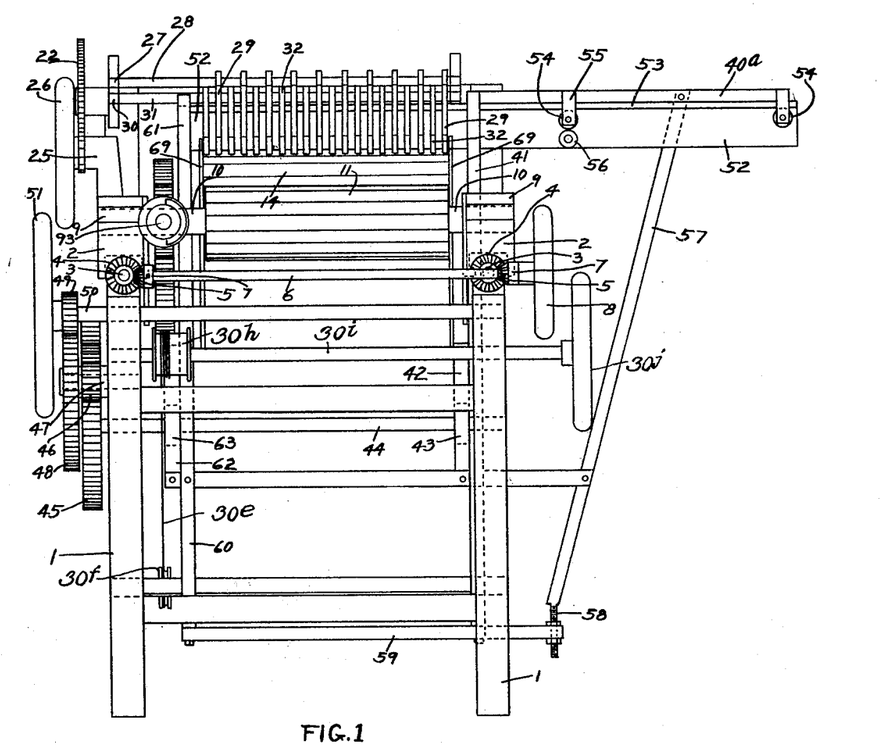
Figure 1 is a front elevational view of my machine for making plating barrels.

When the hand wheel 51 is rotated in one direction, it will lower the post 41 and a ram 52 carried by the bar 40ª. This ram is secured to the bar, by the following means, so that it will have a lateral movement along it. Secured to the upper edge of the ram 52 is a T flange 53 which is free to travel over rollers 54 carried by vertical members 55 secured to the ram bar 40ª, two on each side of the latter as shown in Figure 1. Upon these rollers 54 the ram 52 may be easily shifted by a handle 56 secured to it, to a position between the forming rolls 11 and 14.

The outer end of the ram bar 40ª is supported by an inclined brace bar 57 terminating at its lower end in a vertical part 58 that is secured to the outer end of a cross rod 59. The lower end of the ram post 41 is secured to one end portion of the cross rod 59, while to its other end the lower end of a post 60 is attached. This post has an upper end 61 recessed as shown in Fig. 2 to receive the inner end of the ram 52 when the latter is in its proper position between the forming rolls. Secured to the middle portion of the post 60 is a rack 62 that meshes with a pinion 63 on the shaft 44, whereby when the latter is rotated, the ram posts 41 and 60 may be raised and lowered in unison.

Figure 19:
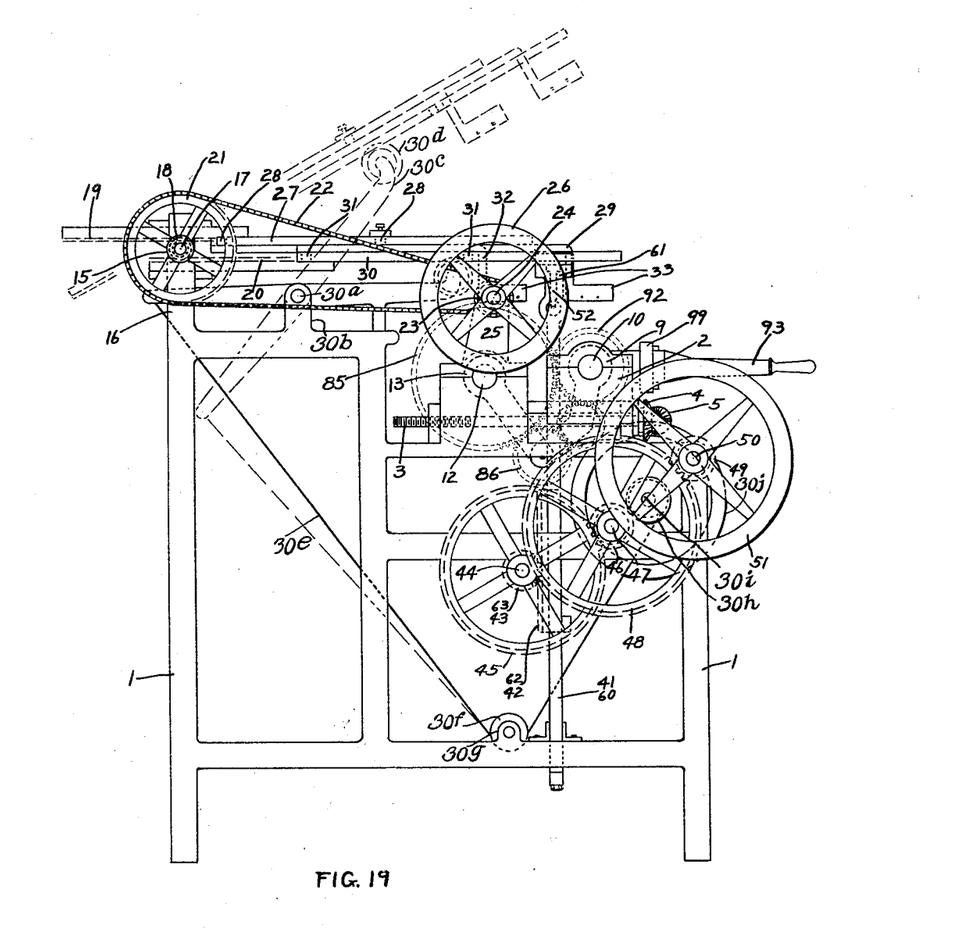
Figure 19 is a side view of the machine.

Before a weaving operation is started, the four finger racks are raised about the pinions 18 as an axis to the dotted line positions shown in Figure 19, by the following means. Secured on a shaft 30ª mounted in bearing projections 30ᵇ on a base frame 1, are two elevating arms 30ᶜ. Also secured to the shaft 30ª is a downwardly inclined arm to the lower end of which one end of a cable 30ᵉ is secured. This cable passes around an idler roller 30ᶠ secured to a projection 30ᵍ on the base frame 1, and thence to and around a spool 30ʰ on a shaft 30ⁱ adapted to be rotated by a hand wheel 30ʲ. When this hand wheel is rotated in one direction the arms 30ᶜ carrying rollers 30ʰ on their upper ends, will engage those rollers with the lower pair of rack bars 20 to elevate the finger carrying frame to the position shown in dotted lines in Figure 19.

The crank wheel 8 is then rotated to slide the blocks 2, 2 through the agency of the screws 3, and gears 4 and 5, to move the forming roll 11 toward the stationary forming roll 14 to leave the proper space between them.

Figure 9:
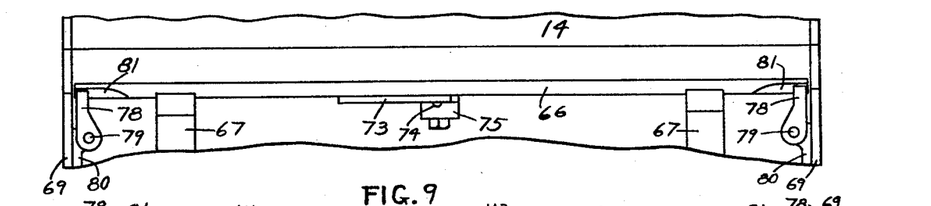
Figure 9 is a top view of the starting strip lock.
Figures 11, 12:
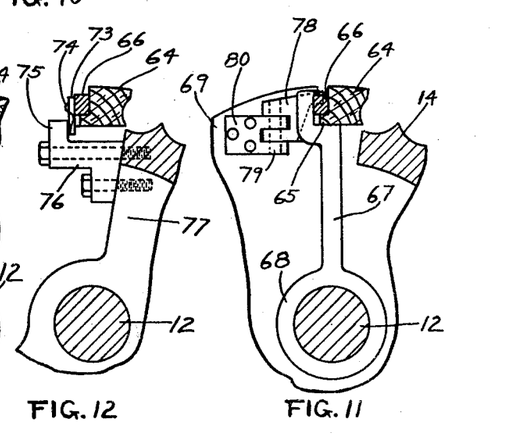
Figure 11 is a cross sectional view taken on the line 11—11 of Figure 10.
Figure 12 is a cross sectional view taken on the line 12—12 of Figure 10.

The means for starting the operation of making a plating barrel in my machine will now be described. Referring to Figure 11, the numeral 64 designates the starting stick or rail of a barrel to be formed. This rail has a bottom flange 65 that is engaged by a cross bar 66 which is secured to two arms 67, 67 that terminate at their lower ends in circular portions 68 which fit loosely around the large roller shaft 12. (See Figures 9 and 11.)

At its ends the barrel starting rail fits into slots in the peripheries of two end spacing rings 69, 69 secured to the large forming roll 14. The fluted portion of the roll 14 comprises about three fourths of its periphery, and opposite each flute on this roll a dowel receiving space 70 is formed in each spacing ring 69. In other words, each spacing ring has a serrated edge opposite the fluted portion of the forming roll 14 to space a proper distance apart, the dowels 71 received by the flutes shown by the dotted lines 72 in Figure 2.

Figure 10:
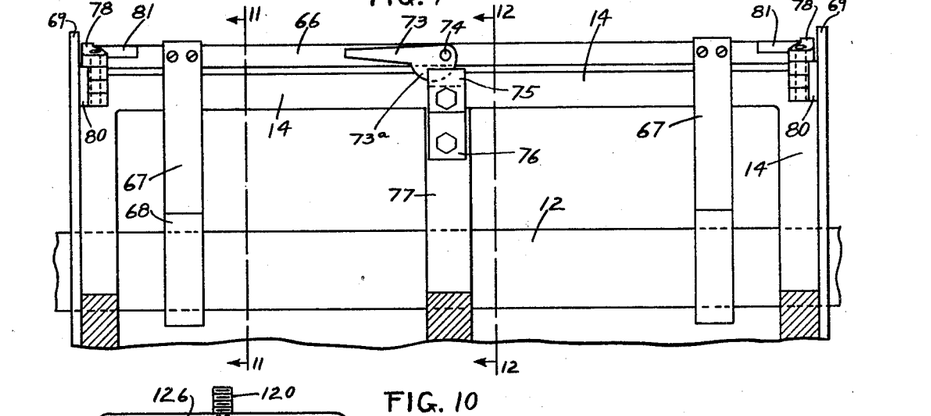
Figure 10 is a front view of the starting strip lock.

When the barrel starting rail 64 is placed in the starting slots in the spacing rings 69, 69, in front of the first fluted portion of the roll 14, the cross bar 66 is clamped against the rail by an eccentric lever 73 pivoted to the bar by a pin 74. (See Figures 9, 10 and 12.) The eccentric face 73a of the inner end of the lever 73 is adapted to be forced against a lug 75 or an angle member 76 bolted to a radial arm 77 fast on the roll shaft 12. (See Figures 10 and 12.)

While inward pressure is exerted against the central part of the cross bar 66 by the clamping lever just described, it is pressed inwardly at its ends by two wedge members 78, 78. These wedge members are pivotally secured by hinge pins 79, 79 respectively to brackets 80, 80 secured to the inner faces of the spacing rings 69, 69. The end surfaces of the cross bar 66 are beveled as shown at 81 in Figures 9 and 10, for contact by the wedge members 78, 78 to force the ends of the cross bar tightly against the barrel starting rail 64.

Figure 5:
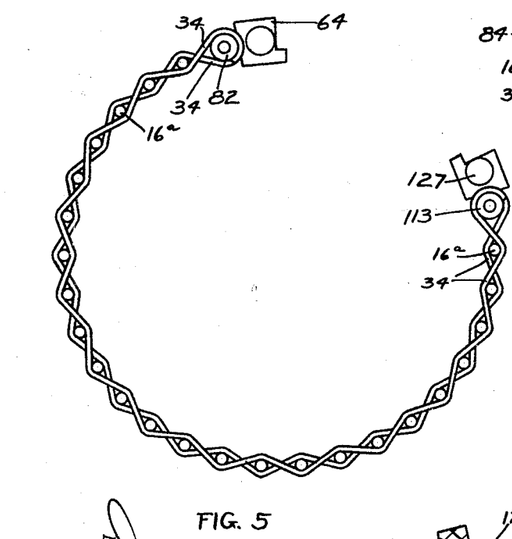
Figure 5 is an end view of the barrel when taken from the machine.

Before the starting rail 64 is placed on the forming roll 14, a starting dowel 82 with splints 34 encircling it, is placed within the grooved part 83 of the rail. (See Figure 5.) The dowel 82 is firmly secured to the starting rail, with the splints between it and the dowel, by screws 84.

Figure 3:
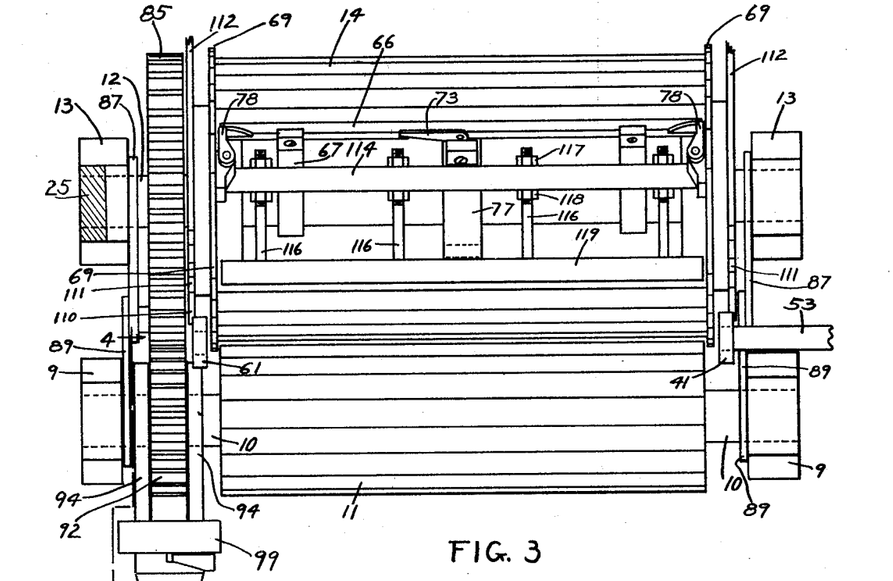
Figure 3 is a view looking down on the large forming roll, small forming roll, driving gears and supporting bearings.

When the starting rail unit just described is placed on the forming roll 14, with the ends of the rail 64 in the starting slots of the spacing rings 69, and clamped firmly on the roll by the cross bar 66, said rail is moved down to a starting position by rotating the roll through the following means: Referring to Figures 2 and 3, there is secured to the right-hand end of the roll shaft 12 a large gear 85 that meshes with an intermediate gear 86 carried by the outer end of an arm 87 loosely secured at its inner end to the roll shaft 12.

The gear 86 is in engagement with another intermediate gear 88 carried by an arm 89 loosely secured at its inner end to the roll shaft 10. The arm 89 is bent outwardly at the point where the gear 88 is attached to it by a stud 90, for connection to the stud 91 upon which the gear 86 is mounted. (See Figure 2.)

Figure 4:
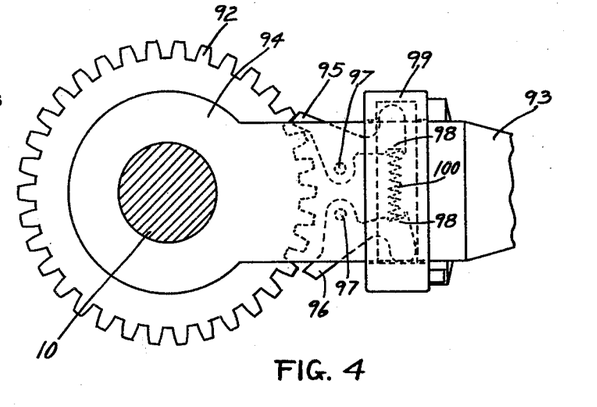
Figure 4 is a side view of the ratchet lever taken on the line 4—4 of Figure 3.

The gear 88 meshes with a gear 92 fast on the roll shaft 10. This gear 92 is turned by the following handle means. Referring to Figures 3 and 4, the numeral 93 designates a handle which terminates at its front end in two spaced, hollow cylindrical portions 94, 94, which fit the shaft 10 and turn loosely upon it.

Between the cylindrical ends 94, 94 of the handle 93, the gear 92 is fitted for the purpose of being rotated by the handle through a ratchet device now to be described. Referring to Figure 4, the numerals 95 and 96 designate two dogs that are pivotally secured to the handle 93 by pivot pins 97. These dogs terminate at their rear ends in recessed shoulder portions 98 within a radius collar 99 secured to the handle.

Between the shoulder portions 98, 98 of these dogs, there is a compression spring 100. These dogs may be alternately engaged with the teeth of the gear 92, in a conventional manner, to turn it in the desired direction to rotate the forming rolls 11 and 14. The gears 85 and 92 are timing gears connected by the idler gears 86 and 88, to effect a relative movement of the small forming roll 11 and the large forming roll 14 where the handle 93 is operated.

After the rail 64 and attached dowel 82 are in proper starting position between the forming rolls 11 and 14, the finger rack is brought down to the position shown in Figure 1. This rack pivots at its rear end upon the pinions 18 that are mounted on the shaft 17.

Figures 14, 15:
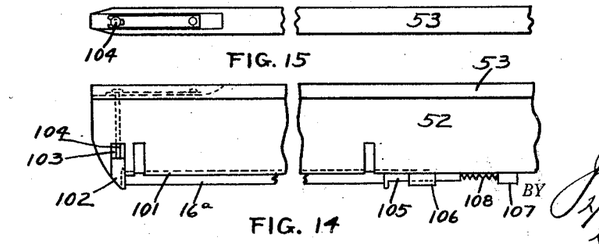
Figure 14 is a front view of the ram.
Figure 15 is a top view of the ram.

The splints attached to the starting barrel rail 64 are now twisted as shown in Figure 2, to bring them within the fingers 29 and 30. Then the fingers are spread apart, as shown in Figure 2, by actuating the finger rack bars 19 and 20. A dowel 16a is then secured to the ram 52 by the following means:

Referring to Figures 14 and 15, the ram 52 is formed with a V groove 101 in its lower edge to receive a dowel 16a which is inserted in it by hand. Secured to the inner end of the ram is a channel stop piece 102, which has a vertical movement in a slot 103 against a spring-raised vertical rod 104. At its rear end the dowel is engaged by a grip rod 105 that is movably supported by a bracket sleeve 106 secured to the bottom edge of the ram. Between the rear end of the grip rod 105 and a fixed stop 107 in the ram, is a pressure spring 108 by means of which the grip rod firmly contacts the dowel.

The dowel 16 secured to the ram 52 is carried by an inward movement of the ram to a position between the twisted splints 34. The hand wheel 51 is then turned to cause the ram to descend until the dowel contacts with the two oppositely disposed teeth 109, 109 immediately below it, on the spacing rings 69, 69 respectively. At the time the dowel contacts the spacing ring teeth, pawls 110, 110 pivotally secured by pivots 110a to the movable ram posts 41 and 60 engage ratchet discs 111, 111 on the roll shaft 12 to rotate the forming rolls 11 and 14. (See Fig. 2.) The rotation of these rolls, and the simultaneous descent of the ram, carry the twisted splints and dowel down together to the position shown for them in Figure 2. At this point pawls 112, 112 pivotally secured to a shaft 30a on the bearings 30b on the base frame 1 engage the teeth on the ratchet disc 111, since that disc has been rotated a distance of one tooth by the descending ram. (See Fig. 2.)

When the ratchet discs 111 are held against reverse movement by the pawls 112, the ram 52 is raised by a reverse movement of the hand wheel 51. The dowel which the ram carried downward, will not accompany it on its upward movement, however, because the twisted splints surround more than half the circumference of the dowel as shown in Figure 2.

The flutes in the rolls 11 and 14 form the splints around the dowel as the rolls are rotated, while the teeth 109 on the spacing rings 69, in co-ordination with the pawls 110 and the ratchets 111 space the dowels apart after they have been introduced between the rolls by the rams 52. The forming operation is also assisted by the pressure that exists between the fluted rolls 11 and 14.

The operation of inserting the dowels, and weaving the splints around them, is continued until the last dowel is in place. The splints are then crossed over that dowel, and a final dowel 113 placed in the ram 52. This final dowel 113 is of the same diameter as the starting dowel 82. The ram is then operated as before to place the final dowel 113 on top of the crossed splints.

Figure 13:
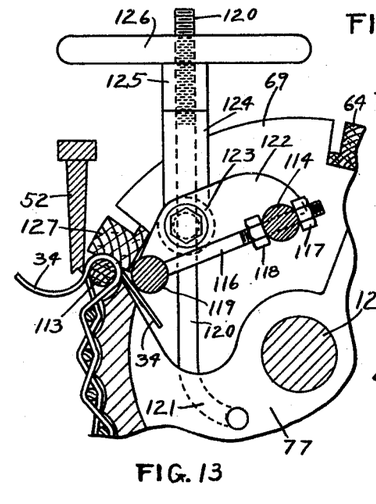
Figure 13 is a sectional view similar to Figure 12 except that it shows the device during the finishing operation.

After the ram 52 is raised and withdrawn from its position between the splints, the latter are crossed over the final dowel 113 (see Figure 13). The ram 52 is then re-inserted between the crossed splints. The fingers 29 and 30 are then raised around the pinions 18 as an axis to the dotted line positions shown in Figure 19, where they are above and out of engagement with the splints.

Referring to Figures 3 and 13, the numeral 114 designates a round transverse member which is pivotally secured at its ends to the spacing rings 69, 69. The member 14 is formed with diametric holes to receive four spaced radial arms 116 that are firmly secured to said member by adjusting nuts 117 and 118 on the threaded ends of said arms.

Secured to the outer ends of the radial arms 116 is a round transverse bar 119 which is free to move circumferentially about the axis of the member 14. The latter member, the transverse bar 119 and the radial arms 116 form together the finishing gate for the weaving operation.

The finishing gate just described is then brought down to the position shown in Figure 13, wherein the round bar 119 is in engagement with the ends of the inner splints. A vertical rod 120 having a lower curved angle end 121, is then inserted at that end in a hole in the arm 77 on the roll shaft 12 (see Figure 13).

The clamping device now to be described is fitted upon the rod 120 to force the round bar 119 of the gate against the ends of the inner splints to bend them downwardly to the position which they occupy in Figure 13. This clamping device comprises two side plates 122, 122 having recesses at their ends to fit the members 114 and 119. These plates are connected by a swivel bar 123. Projecting vertically from the middle portion of this swivel bar is a radial sleeve 124 connected to it.

The sleeve 124 is slipped over the vertical rod 120 which projects upwardly through a hole in the swivel bar 123 directly below the sleeve. The outer end of the rod 120 is threaded to receive a hollow threaded stud 125 on a hand wheel 126. Now, when this hand wheel is rotated upon the threaded rod 120, it will force the clamping device just described against the round bar 119 of the finishing gate to press the ends of the inner splints down to the positions which they occupy in Figure 13.

Figure 6:
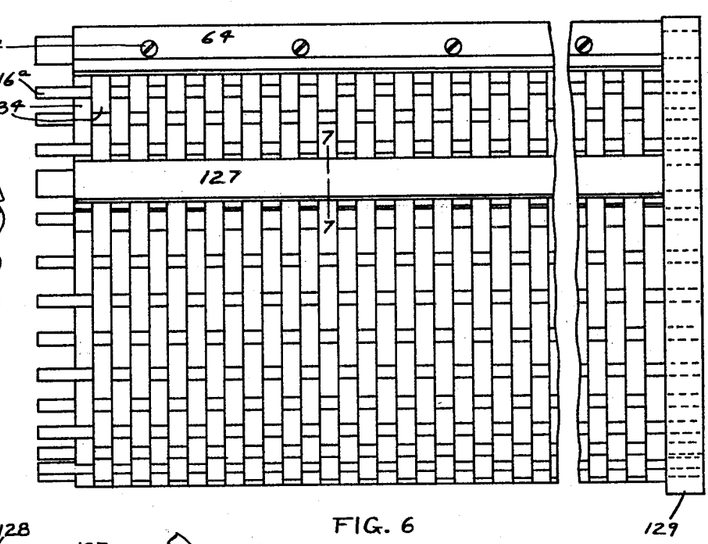
Figure 6 is a side view of said barrel.
Figure 7:
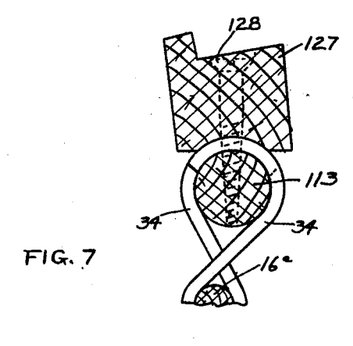
Figure 7 is a sectional view taken on the line 7—7 of Figure 6, showing the means of locking the door strip, splint and dowels together.
Figure 8:
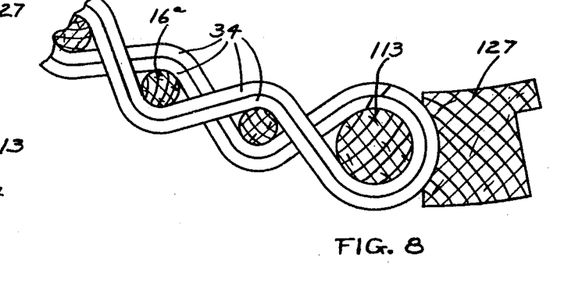
Figure 8 is a view similar to Figure 7, showing a double splint woven instead of a single.

The fluted forming rolls 11 and 14 are then turned in a reverse direction by the handle 93 in Figure 7. The ram 52 is then brought down into engagement with the ends of the outer splints as shown in Figure 13, to press them down. The clamping device and rod 120 are then removed. A final stick 127, similar to the starting stick 64, is then inserted in two oppositely disposed slots in the spacing rings 69, 69. (See Figure 13.) This stick 127 is then firmly secured to the final dowel 113 by screws 128. The barrel having been completely formed is then removed after the gate is loosened and the ram 52 has been withdrawn from its position above the splints. After the barrel is removed, heads such as the head 129 shown in Figure 6, are applied to its ends.

Having described my invention, I claim:

1. In a machine of the class described, the combination with a pair of co-acting fluted forming rolls, alternately movable fingers for presenting pliable splints to said rolls, a ram movable to a position between the splints to place the dowel between them, means for withdrawing the ram after the dowel is gripped between the splints, and means for rotating the rolls and reversing the fingers to bend the splints around the dowel.

2. In a machine of the class described, the combination with a pair of co-acting fluted forming rolls, means for presenting pliable splints to said rolls, a ram for introducing dowels between said splints when the latter are between the rolls, and means spacing the dowels apart after they have been introduced between the rolls by the ram.

3. In a machine of the type described, the combination with a pair of co-acting fluted forming rolls, alternately movable fingers for presenting pliable splints to said rolls, a ram laterally movable to a position between the splints to place a dowel between them, means for lowering the ram and turning the rolls to carry the splints and dowel downwardly together to a position where the splints surround more than half the circumference of the dowel, means for then raising the ram so that it may be withdrawn from its position between the splints, and means for then crossing the fingers to bend the splints around the dowel.

4. In a machine of the class described, the combination with a pair of co-acting fluted forming rolls, spacing rings secured to the ends of one roll, said rings having oppositely disposed recesses opposite the flutes in said roll, alternately movable fingers for presenting pliable splints to said rolls and for spreading the outer ends of said splints apart, and for placing dowels in the flutes and the oppositely disposed recesses in the rings on the roll to which said rings are secured, when the splints are spread apart by the fingers and means for simultaneously lowering the dowel placing means and turning the fluted rolls to bring a dowel into proper position between the splints.

5. In a machine of the class described, the combination with a pair of co-acting rolls, spacing rings secured to the ends of one roll, said rings having oppositely disposed recesses opposite the flutes in said roll, alternately movable fingers for presenting pliable splints to said rolls and for spreading the outer ends of said splints apart, a laterally and vertically movable ram for placing dowels in the flutes and the oppositely disposed recesses in the rings, and means for simultaneously lowering the ram and turning the fluted rolls to bring a dowel into proper position between the splints.

6. In a machine of the class described, the combination with a pair of co-acting rolls, spacing rings secured to the ends of one roll, said rings having oppositely disposed recesses opposite the flutes in said roll, alternately movable fingers for presenting pliable splints to said rolls and for spreading the outer ends of said splints apart, a laterally and a vertically movable ram for placing dowels in the flutes and the oppositely disposed recesses in the rings, means for simultaneously lowering the ram and turning the fluted rolls to bring a dowel into proper position between the splints, said ram adapted to be raised above the dowel after the latter is wedged between the splints, to permit the rolls to be turned to bend the splints around the dowel.

7. In a machine of the class described, the combination with a pair of co-acting fluted forming rolls, alternately movable fingers for presenting pliable splints to said rolls, a ram laterally movable to a position between the splints to place a dowel between the latter, serrated spacing rings on the ends of one roll to receive the dowels, and space them apart, means for lowering the ram and turning the rolls to carry the dowel and splints downwardly together to a position where the splints surround more than half the circumference of the dowel, and means for raising the ram to a position from which it may be withdrawn laterally from the splints to receive another dowel, and means for crossing the fingers to bend the splints around the dowel between them and for spreading the outer ends of said splints apart preparatory to receiving the next dowel.

8. In a machine of the class described, the combination with a pair of co-acting forming rolls, a pair of spacing rings secured to one of said rolls, said rings formed with oppositely disposed recesses to receive a starting rail, pliable splints secured at one end to said rail and means for placing dowels between said splints, said rolls being fluted to form the splints around the dowels.

9. In a machine of the class described, the combination with a pair of co-acting forming rolls, a pair of spacing rings secured to one of said rolls, said rings formed with oppositely disposed recesses to receive a starting rail, pliable splints secured at one end to said rail, means for placing dowels between said splints, said rolls being fluted to form the splints around the dowels, said rings having a recess to receive a final rail, and clamping means for bending the splints around said final rail.

10. In a machine of the class described, the combination with a pair of co-acting fluted rolls, toothed spacing rings secured to the ends of one roll, alternately movable fingers for presenting pliable splints to said rolls, a laterally and vertically movable ram for placing dowels in the roll, flutes between the teeth on the spacing rings, means for lowering the ram to present a dowel to the teeth of the spacing rings, and means for rotating the fluted rolls at the time a dowel contacts the teeth on the spacing rings, to carry the twisted splints and dowel down together to a starting position between the fluted rolls.

11. In a machine of the class described, the combination with a pair of co-acting fluted rolls, toothed spacing rings secured to the ends of one roll, alternately movable fingers for presenting pliable splints to said rolls, a laterally and vertically movable ram for placing dowels in the roll flutes between the teeth on the spacing rings, means for lowering the ram to present a dowel to the teeth of the spacing rings, and pawl and ratchet means for rotating the fluted rolls at the time a dowel contacts the teeth on the spacing rings, to carry the twisted splints and dowel down together to a starting position between the fluted rolls.

12. In a machine of the class described, the combination with a pair of co-acting forming rolls, one of said rolls being larger than the other and each having equally spaced transverse flutes in its periphery to receive dowels, means for rotating one roll, and a gear connection between said rolls to bring the fluted portion of one roll opposite a fluted portion in the other roll to form splints around the dowels between the rolls.

13. In a machine of the type described, the combination with a pair of co-acting fluted forming rolls, a spacing ring secured to each end of one roll, said rings formed with oppositely disposed spacing slots, to receive a barrel starting rail having a bottom flange, a shaft to which each roll is secured, arms loosely fitted on the spacing ring-roll shaft, a cross bar carried by said arms for engagement with said starting rail, and means for clamping said cross bar against the barrel starting rail to hold the latter firmly in the starting slots in the spacing rings.

14. In a machine of the type described, the combination with a pair of co-acting fluted rolls, means for clamping to one of said rolls a starting rail to which a starting dowel and attached splints are attached, means for rotating said rolls to move said starting rail, dowel and splints down to a starting position, fingers free to be moved in opposite directions to spread the outer ends of said splints apart, a laterally and vertically movable ram for inserting a dowel between the spread splints, and means for crossing said fingers to bend the splints partially around the last dowel inserted between them by the ram and spreading their outer ends apart to receive the next dowel.

15. In a machine of the type described, a pair of co-acting fluted forming rolls to receive dowels and splints between them, spacing rings on one roll to space said dowels, means for rotating said rolls to form the splints around the dowels, means for crossing the outer ends of the splints after they have been formed around a dowel, a transverse member pivotally secured between said rings, and a finishing gate secured to said member to engage the ends of the inner splints after the final crossing of them.

16. In a machine of the type described, a pair of co-acting fluted forming rolls to receive dowels and splints between them, spacing rings on one roll to space said dowels, means for rotating said rolls to form the splints around the dowels, means for crossing the outer ends of the splints after they have been formed around a dowel, a transverse member pivotally secured between said rings, a finishing gate secured to said member to engage the ends of the inner splints after the final crossing of them, and a clamping device adapted to hold said gate against the ends of said splints.

17. In a machine of the type described, a pair of co-acting fluted forming rolls to receive dowels and splints between them, spacing rings on one roll to space said dowels, means for rotating said rolls to form the splints around the dowels, means for crossing the outer ends of the splints after they have been formed around a dowel, a transverse member pivotally secured between said rings, radial arms on said member, a round transverse bar secured to the ends of said arms to engage the ends of the inner splints after the final crossing of them, a clamping frame adapted to be applied to the transverse member and the transverse bar, a fixed rod having a threaded outer end, projecting upwardly through said frame, a sleeve on said rod above the frame, and a handle nut on the rod to force the sleeve against the clamping frame to hold the round transverse bar tightly against the splint ends.

18. In a machine of the type described, a pair of co-acting forming rolls to receive splints between them, a ram for inserting dowels between the splints, means for rotating the rolls to form the splints around the dowels, and a gate carried by one roll to hold one half of the final ends of the woven structure while the ram is adapted to engage and hold the remaining half of it.

19. A weaving finger for a machine of the class described, comprising a bar having a foot portion terminating in an end formed with a straight side, the latter being bent around its outer end to provide a U-shaped portion, a roller transversely mounted in said U-shaped portion, and a roller also secured to the straight side of the foot portion beyond the U-shaped part, said rollers adapted to receive a pliable wood splint between them.

In testimony whereof I have hereunto set my hand this 8th day of June, 1931.

JOHN KING.